United States Patent Office 3,087,855
Patented Apr. 30, 1963

3,087,855
O-HIGHER ALKENYLPHENYL O,O-DIALKYL THIONOPHOSPHATE TRIESTER COMPOUNDS
James Coull, 317 Fieldbrook Drive, Pittsburgh 34, Pa., and Donald E. Vierling, 4594 Doverdell Drive, Pittsburgh 36, Pa.
No Drawing. Filed Jan. 23, 1959, Ser. No. 788,515
12 Claims. (Cl. 167—30)

This invention relates to thiophospho esters and more particularly to alkyl phenol dialkoxythiophospho esters defined in general by the following structural formula:

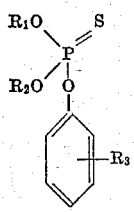

wherein $R_1$ and $R_2$ are alkyl radicals, the same or different, preferably lower alkyl radicals having from one to three carbon atoms, for example, methyl, ethyl or propyl; and $R_3$ is a straight chain aliphatic hydrocarbon having, for example, from 9 to 18 carbon atoms, preferably from 13 to 16 carbon atoms, most preferably 15 carbon atoms. $R_3$ can be completely saturated or can contain one, two or three ethylenic bonds, said bonds being located particularly beyond the seventh carbon atom. Such ethylenic bonds are in many cases desirable since they permit the introduction in the $R_3$ group, for beneficial purposes, of such diverse substituents as halogens, especially bromine, chlorine or iodine, primary or secondary amines, etc. While $R_3$ can be present in any position on the ring, it is preferred that it be present in the meta position. Although in the preferred embodiment of the invention only one $R_3$ group is present, it is within the purview thereof to have two $R_3$ groups attached to the ring. In cases wherein two $R_3$ groups are present one of such $R_3$ groups must be in the meta position. The remaining positions on the ring are preferably satisfied with hydrogen but can be satisfied with such diverse radicals as halogens, for example, chlorine and bromine, aldehydic groups, amino groups, O,O-dialkyl-halo-thionophosphates, etc. Representative compounds which are included within the scope of the above structural formula are:

3-nonyl-phenyl-O,O-dimethylthionophosphate,
5-nonyl-phenyl-O-O-diethylthionophosphate,
5-chloro-3-nonyl-phenyl-O,O-dipropylthionophosphate,
3-dodecyl-phenyl-O,O-ethyl-methyl-thionophosphate,
6-dodecyl-phenyl-O,O-dipropyl-thionophosphate,
4-bromo-dodecyl-phenyl-O,O-dimethylthionophosphate,
3-pentadecyl-phenyl-O,O-diethylthionophosphate,
3-pentadecenyl-8-phenyl-O,O-dimethylthionophosphate,
3 - pentadecatrienyl-8,11,14-phenyl-O,O-dimethylthionophosphate,
5 - amino - 3-pentadecenyl-8,O,O-phenyl-diethylthionophosphate,
3 - pentadecyl - 1,2-phenyl-di(O,O-dimethylthionophosphate),
3-pentadecyl-2-phenyl-O,O-dimethylthionophosphate,
2 - aldehydro-3-pentadecyl-phenyl-O,O-diethylthionophosphate,
5 - aldehydro-3-pentadecyl-phenyl-O,O-dimethylthionophosphate,
3-octadecanyl-phenyl-O,O-dipropylthionophosphate,
4-octadecanyl-phenyl-O,O-diethylthionophosphate, and
5 - chloro - 3-octadecenyl-8-phenyl-O,O-dimethylthionophosphate.
3 - pentadecadienyl-8,11-phenyl-O,O-diethylthionophosphate.

This invention also relates to a process of using the new compounds as pesticides. By "pesticide" we mean a compound which will destroy lower forms of life such as internal and external parasites and insects.

The new compounds of this invention can be obtained, for example, by reacting approximately equal molar amounts of an O,O-dialkyl-halothionophosphate, such as O,O-dimethyl-chloro-thionophosphate, with an appropriate alkyl phenol which will insure obtaining the compound defined hereinafter, such as 3-pentadecylphenol. Other O,O-dialkyl-halo-thionophosphates which can be employed are O,O-diethyl-chloro-thionophosphate, O,O-dipropylchloro-thionophosphate, O,O-methyl-ethyl-chloro-thionophosphate, O,O-dimethyl-bromo-thionophospsate, O,O-diethyl-bromo-thionophosphate, O,O-diproyl-bromo-thionophosphate, etc., and other alkyl phenols which can be employed are:

3-nonyl phenol,
5-nonyl phenol,
5-chloro-3-nonyl phenol
3-dodecyl phenol,
6-dodecyl phenol,
4-bromo dodecyl phenol,
3-pentadecenyl-8-phenol,
3-pentadecadienyl-8,11-phenol,
3-pentadecatrienyl-8-11,14-phenol
5-amino-3-pentadecenyl-8-phenol,
3-pentadecyl-1,2-dihydroxy phenol,
3-pentadecyl-2-phenol,
2-aldehydo-3-pentadecyl phenol,
5-aldehydo-3-pentadecyl phenol,
3-octadecanyl phenol,
4-octadecanyl phenol, and
5-chloro-3-octadecenyl-8-phenol.

The reaction can be carried out at pressures, which can be, for example, from about 10 to about 100 pounds per square inch gauge, and elevated temperatures, which can be, for example, about 50° to about 120° C. in the presence of an acid binding agent such as sifted dry potassium carbonate, sodium carbonate, potassium hydroxide, etc. While the reaction can be carried out without the use of a solvent, it is preferred that a solvent in which the alkyl phenol is soluble be employed. Of particular suitability as solvents in the present process are ketones such as acetone, methyl ethyl ketone, etc. A catalyst is not required although its use accelerates the reaction. Finely divided copper or copper salts, such as cuprous chloride, cupric chloride, copper oleate, etc., can be employed as catalyst if desired. The reaction period can vary from about one to about six hours depending upon the temperature.

Specific methods for preparing the new compounds of this invention are illustrated below in Examples I, II and III.

*Example I*

150 grams of 3-pentadecylphenol are dissolved in 250 milliliters of methylethylketone to which are added 96 grams of O,O - dimethyl-chlorothionophosphate. The mixture is heated to 78° C. while stirring. Twenty-eight (28) grams of potassium hydroxide are dissolved in 30 milliliters of water and 150 milliliters of commercial grade ethanol and added dropwise over a period of three hours to the 3-pentadecylphenol solution. Potassium chloride is precipitated out and the reaction is completed in about four hours. The solution is cooled, filtered and purified by removal of solvent and the excess O,O-dimethyl-chloro-thionophosphate. The yield of 3-pentadecylphenol, O,O-dimethylthionophosphate ester obtained as a waxy solid is 80 percent. It can be represented by the following structural formula:

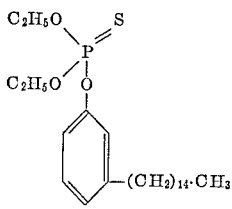

Example II

The run of Example I was repeated except that 150 grams of FW–28, manufactured by Colloid Chemical Laboratories, Inc., Cedar Knolls, New Jersey, which is believed to be a mixture of 3-pentadecylphenol, 3-pentadecenyl-8-phenol, 3-pentadecadienyl-8,11-phenol and 3-pentadecatrienyl-8,11,14-phenol, was employed in place of 3-pentadecylphenol. A liquid reaction product was obtained, which was found to contain 3-pentadecylphenol O,O - dimethylthionophosphate; 3-pentadecenyl-8-phenol O,O - dimethylthionophosphate; 3-pentadecadienyl-8,11-phenol O,O-dimethylthionophosphate; and 3-pentadecatrienyl - 8,11,14 - phenol O,O - dimethylthionophosphate. These can be represented by the following structural formulae:

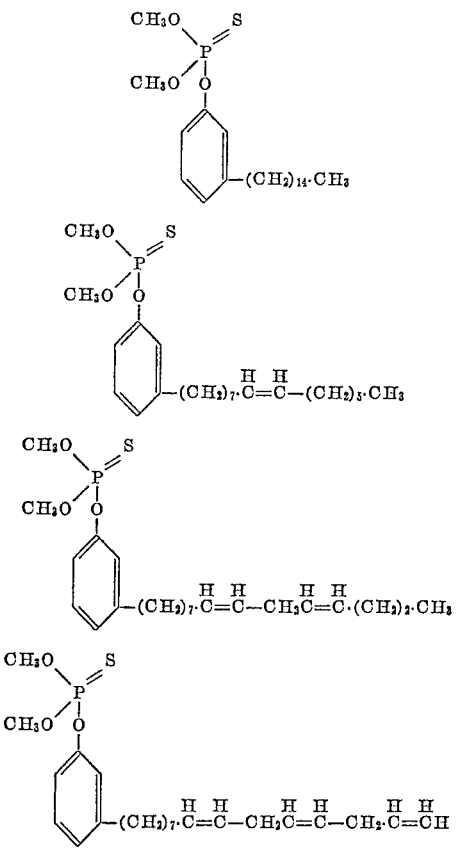

Example III 300 grams of FW–28 was dissolved in 400 milliliters of methylethylketone. To this was added 148 grams of dry anhydrous potassium carbonate and two grams of copper-bronze powder as catalyst. While this solution was being refluxed 194 grams of O,O-diethyl-chloro-thionophosphate was run in slowly. The mixture was heated for 4 hours, after which the salts formed were filtered off and the filtrate freed from solvent and excess O,O-dimethyl-chloro-thionophosphate. A yield of 80 percent of the O,O-diethylthionophosphate esters corresponding to those of Example II was obtained.

The new esters obtained in the present invention are remarkable in that they possess powerful insecticidal, nematocidal and anthelmintic properties while being substantially non-toxic to warm blooded animals. Such results are completely unexpected. The O,O-dialkyl-halo-thionophosphates are known to have excellent insecticidal properties. This is believed to be due to their ability to destroy chlorinestrase connecting nerve tissues. Unfortunately such compounds are not selective in their ability to destroy chlorinestrase, for they tend to destroy chlorinestrase in warm blooded animals as well as in lower forms of life. For such reason the use of O,O-dialkyl-halo-thionophosphates to destroy lower forms of life is severely limited since they must not come in contact with warm blooded animals. Phenols defined by the structural formula

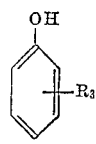

wherein $R_3$ is as before, are similarly compounds generally prevented from coming in contact with warm blooded animals because of their powerful vesicant properties. We have found, however, that when such compounds are reacted with each other to obtain the resultant new compounds of this invention, such new compounds possess powerful insecticidal, nematocidal and anthelmintic properties, but yet are not essentially toxic to warm blooded animals and do not exhibit vesicant properties. In addition the new esters are stable in storage, relatively non-volatile, have the ability of penetrating into porous surfaces and spreading in oily films, thereby prolonging their residual effect, and possess a pleasant odor. All of these properties are extremely important and highly desirable in insecticides, nematocides and anthelmintics.

The new compounds of this invention are excellent pesticides. For insecticidal and nematocidal use, we prefer to employ a water emulsion containing, for example, about one to ten percent of the active compound, about one-fourth to one percent of a suitable dispersing agent, such as sodium tetradecyl sulfate[1] and the remainder water. For use against internal parasites, we prefer to employ a medicated feed in which the active compound is dispersed in the animal's daily feed regimen. Generally this involves dispersing about three to about ten percent of the active compound in the feed regimen. Alternatively the active compound can be placed in a gelatinous-type capsule and administered orally to the animal.

The uses to which the new esters obtained in the present invention can be put are set forth in the following examples.

Example IV

An emulsion containing 5.00 percent by weight of pentadecyl phenol O,O-diethylthionophosphate, one half percent by weight of Tergitol Anionic No. 7 (as dispersing agent) and 94½ percent by weight of water was prepared by mixing the same in a Waring Blendor for two minutes. This emulsion was sprayed over a nematode infected soil in the amount of one gallon per 1000 square feet of soil. This soil before spraying was found to contain approximately 147 nematodes per cubic foot. Approximately four weeks after treatment the soil was carefully inspected to a depth of about 36 inches. No living nematodes were found. Similar results were conducted in other infested areas with same results, indicating excellent nematocidal action. No adverse toxic or vesicant effects were found on animals or people who came in contact with such area.

---

[1] Tergitol Anionic #7 manufactured by Union Carbide Chemicals Company of New York, New York.

Example V

Three pigs weighing approximately 35 pounds each were treated with 8 grams of 3-pentadecyl phenol O,O-diethylthionophosphate per pig. At the start of the test the pigs were checked and found to contain 706 ascarid eggs per gram of feces. Two weeks after the 3-pentadecyl phenol O,O-diethylthionophosphate was administered the pigs were again checked, and it was found that the ascarid egg count was reduced 80 percent. No adverse toxic or vesicant effects were found. This test not only proves excellent anthelmintic action, but also shows that the toxicity of alkyl phenol O,O-dialkylthionophosphate esters to warm blooded animals is abnormally low.

In this connection it should be pointed out that in general most organo phosphorous anthelmintics and insecticides are very toxic to warm blooded animals. The maximum allowable and safe dosage of most organo phosphorous anthelmintics and insecticides, for example, are in the range of about 40 to about 50 milligrams per kilogram of body weight for warm blooded animals. Our tests indicate that about 80 to about 100 milligrams of our new esters can be administered per kilogram of body weight for warm blooded animals with safety. This points out the extremely low toxicity of our new esters, a great advantage in both the insecticidal and anthelmintic industries.

Example VI

An emulsion containing 4.75 percent by weight of 3-pentadecyl phenol O,O-diethylthionophosphate, 0.57 percent by weight of Tergitol Anionic No. 7 and 94.68 percent by weight of water was prepared by mixing the same in a Waring Blendor. Common house flies, common grasshoppers and Japanese beetles were sprayed with the emulsion. About 150 to 200 flies were placed in a cage measuring 2 feet by 2 feet by 2 feet of fine screen. The flies were sprayed through the screen for about 8 to 9 seconds. Within 30 seconds all of the flies were flat on their backs and unable to fly and shortly afterwards were lifeless. When the same emulsion was sprayed on about 200 grasshoppers, it was found that they all died within 60 seconds. Again the emulsion was sprayed on about 100 Japanese beetles. Initially they were unable to fly, but after about one hour they turned on their backs and died.

Similar tests were conducted on aphids, potato bugs, fleas and lice with the same excellent results.

Numerous modifications and variations of the invention can be made in accordance with the description made hereinabove without departing from the spirit and scope thereof, and therefore only such limitations should be imposed as are indicated in the appended claims.

We claim:

1. Esters of the formula:

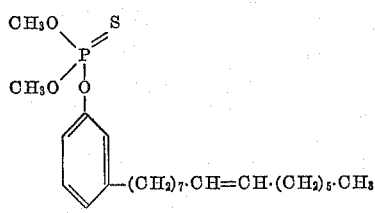

2. Esters of the formula:

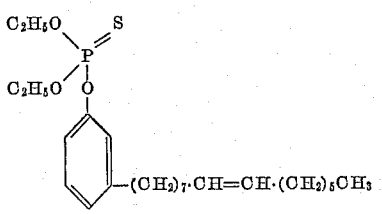

3. Esters of the formula:

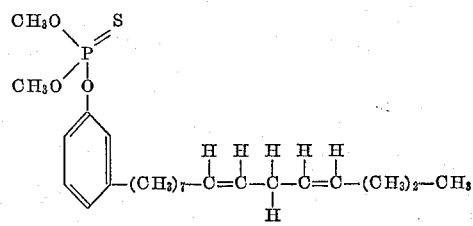

4. Esters of the formula:

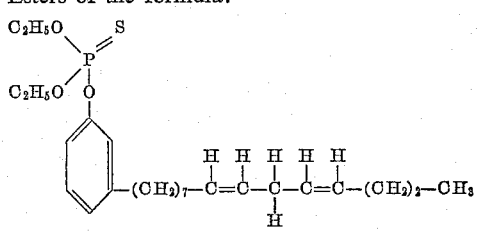

5. Esters of the formula:

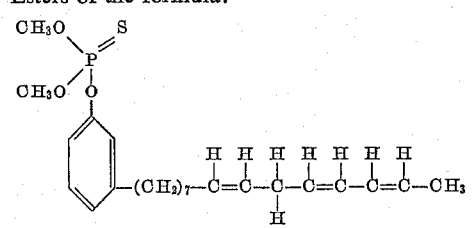

6. Esters of the formula:

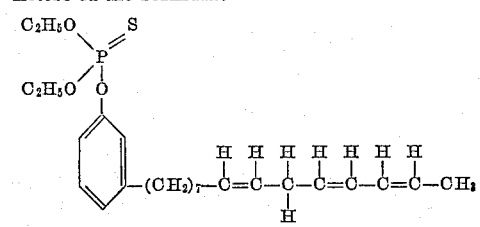

7. A method of controlling lower forms of life which comprises contacting lower forms of life with the esters of claim 1.

8. A method of controlling lower forms of life which comprises contacting lower forms of life with the esters of claim 2.

9. A method of controlling lower forms of life which comprises contacting lower forms of life with the esters of claim 3.

10. A method of controlling lower forms of life which comprises contacting lower forms of life with the esters of claim 4.

11. A method of controlling lower forms of life which comprises contacting lower forms of life with the esters of claim 5.

12. A method of controlling lower forms of life which comprises contacting lower forms of life with the esters of claim 6.

References Cited in the file of this patent

UNITED STATES PATENTS

| | | |
|---|---|---|
| 2,381,127 | Kemp | Aug. 7, 1945 |
| 2,389,513 | Kemp | Aug. 20, 1945 |
| 2,414,263 | Kemp | Jan. 14, 1947 |
| 2,861,876 | Birum | Nov. 25, 1958 |
| 2,887,505 | Blair | May 19, 1959 |

OTHER REFERENCES

Metcalf et al.: "J. Econ. Entomol.," 42, pp. 721–28 (1949).